United States Patent
Qin et al.

(10) Patent No.: US 11,072,241 B2
(45) Date of Patent: *Jul. 27, 2021

(54) KNOB DEVICE FOR VEHICLE

(71) Applicant: AAC Technologies Pte. Ltd., Singapore (SG)

(72) Inventors: Yingming Qin, Shenzhen (CN); Bing Xie, Shenzhen (CN)

(73) Assignee: AAC Technologies Pte. Ltd., Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 16/995,776

(22) Filed: Aug. 17, 2020

(65) Prior Publication Data

US 2020/0406758 A1 Dec. 31, 2020

Related U.S. Application Data

(63) Continuation of application No. PCT/CN2019/094051, filed on Jun. 30, 2019.

(51) Int. Cl.
*B60K 37/06* (2006.01)
*G05G 1/10* (2006.01)
*G05G 5/03* (2008.04)
*G05G 5/06* (2006.01)
*H01H 19/14* (2006.01)

(52) U.S. Cl.
CPC ............. *B60K 37/06* (2013.01); *G05G 1/10* (2013.01); *G05G 5/03* (2013.01); *G05G 5/06* (2013.01); *G05G 2505/00* (2013.01); *H01H 19/14* (2013.01)

(58) Field of Classification Search
CPC .................................................. G05G 2505/00
See application file for complete search history.

(56) References Cited

U.S. PATENT DOCUMENTS

| | | | | |
|---|---|---|---|---|
| 4,253,690 A | * | 3/1981 | Hollander | F16K 35/00 292/354 |
| 9,791,884 B2 | * | 10/2017 | Konno | G05G 1/08 |
| 2008/0185272 A1 | * | 8/2008 | Otani | G06F 3/0362 200/318 |
| 2008/0197004 A1 | * | 8/2008 | Ishigaki | H01H 9/24 200/336 |

* cited by examiner

*Primary Examiner* — Vicky A Johnson
(74) *Attorney, Agent, or Firm* — W&G Law Group LLP (57) ABSTRACT

A knob device for vehicle includes a knob unit and a locking unit. The knob unit includes a rotating cover with an open end, a rotary shaft mounted to the open end, and a motor fixed to the rotating cover for driving the rotating cover to vibrate. The locking unit includes a rotary wheel which includes a main body fixed to the rotary shaft and latching teeth formed at a periphery of the main body and distributed in a ring around a central axis of the rotary wheel, a gap being defined between two neighboring teeth, an iron core configured to be inserted into the gap to limit rotation of the rotary wheel, and a solenoid connected to the iron core for driving the iron core to move. The knob device can realize locking of the rotary wheel clockwise and counter-clockwise, meeting requirement of diverse use.

20 Claims, 14 Drawing Sheets

KNOB DEVICE FOR VEHICLE

FIELD OF THE INVENTION

The present disclosure relates to the technical field of automotive accessories, and in particular to a knob device for vehicle.

BACKGROUND OF THE INVENTION

In recent years, with the rapid development of science and technology, a popularity rate of automotive cars is getting higher and higher. In automotive accessories, volume keys, air conditioning adjusting keys, and screen brightness adjusting keys are mostly designed in the form of knobs.

In the related art, the knob device for vehicle includes a knob unit. The knob unit includes a rotating cover and a rotary shaft. The rotary shaft is connected to the rotating cover, and related function keys are adjusted by rotating the rotating cover. In such design, a position of the rotating cover cannot be locked. The rotating cover is easy to be operated mistakenly, which affects the user experience.

Therefore, it is necessary to provide an improved knob device for vehicle to solve the above technical problems.

SUMMARY OF THE INVENTION

An object of the present disclosure is to provide a knob device for vehicle which is simple in structure and can be locked.

The present disclosure provides a knob device for vehicle comprising a knob unit and a locking unit, the knob unit comprising a rotating cover with an open end, a rotary shaft being mounted to the open end of the rotating cover, and a motor being fixed to the rotating cover and configured to drive the rotating cover to vibrate; the locking unit comprising a rotary wheel being mounted to the rotary shaft, the rotary wheel comprising a main body being fixed to the rotary shaft, and a plurality of latching teeth being formed at a periphery of the main body, the plurality of latching teeth being distributed in a ring around a central axis of the rotary wheel, a gap being defined between two neighboring latching teeth, an iron core being provided corresponding to the gap and configured to be inserted into the gap to limit rotation of the rotary wheel, and a solenoid being connected to the iron core and configured to drive the iron core to move.

Preferably, the number of the latching teeth is eight, and an angle spanned by each latching tooth is 45°.

Preferably, each of the latching teeth comprises a first end, a second end, and a transition surface interconnecting the first end and the second end, a distance between the first end and the central axis of the rotary wheel is greater than a distance between the second end and the central axis of the rotary wheel, and the transition surface is curved.

Preferably, a width of the iron core is greater than or equal to a width of the gap in a circumferential direction of the rotary wheel.

Preferably, the rotating cover comprises an outer surface and an inner surface opposite to the outer surface, the inner surface comprises two mounting surfaces arranged in parallel and spaced from each other and two connecting surfaces connecting the two mounting surfaces.

Preferably, two symmetrical first latching poles extend from the connecting surfaces along directions away from the outer surface, two symmetrical latching slots are recessed from the mounting surfaces along directions towards the outer surface, the two first latching poles are arranged along a Y-axis direction, and the two latching slots are arranged along an X-axis direction, wherein the Y-axis direction is a vibration direction of the motor, and the X-axis direction is perpendicular to the Y-axis direction.

Preferably, the rotary shaft comprises a connecting portion and a shaft body connected to the connecting portion, the connecting portion is received in the open end of the rotating cover, the connecting portion comprises a first portion connected to the shaft body, and a second portion and a third portion which extend from opposite two ends of the first portion along a direction away from the shaft body, the second portion and the third portion are arranged in parallel and spaced from each other, and the second portion and the third portion abut on the mounting surfaces respectively.

Preferably, a protrusion extends from each of the two ends of the first portion along a direction towards the mounting surface of the rotating cover, the protrusions conform to the latching slots respectively, and the protrusions are engaged in the latching slots respectively.

Preferably, a second latching pole extends from each of two sides of the first portion along a direction towards the connecting surface of the rotating cover, each second latching pole is aligned with a corresponding one first latching pole, the knob unit further comprises a spring, one end of the spring is mounted around the first latching pole, the other end of the spring is mounted around the second latching pole, end portions of the first latching pole and the second latching pole are spaced from each other, and a middle portion of the spring between the end portions of the first latching pole and the second latching pole is suspended.

Preferably, the knob device for vehicle further comprises an encoder and a controller, the encoder is connected to the rotary shaft by a coupling, the encoder is configured to detect a rotation angle of the rotary wheel and transmit a detection data in response to the rotation angle to the controller, and the controller is configured to control operation of the solenoid in response to the detection data.

Preferably, a space is formed between the second portion and the third portion, and the motor is received in the space.

Preferably, the connecting portion and the shaft body are integrally formed.

Preferably, further comprising a brush slip ring unit which comprises a pair of slip rings fixed around the rotary shaft and brushes slidably contacting with the slip rings respectively, wherein the rotary shaft defines a wire channel, and power wires and control wires of the motor are arranged in the wire channel and electrically connected to the slip rings respectively.

Preferably, the brush slip ring unit comprises a pair of brushes corresponding to each of the slip rings, and an elastic member connected between the pair of brushes and configured to urge the pair of brushes to firmly contact with the corresponding slip ring.

The present disclosure also provides a knob device which comprises a knob unit and a locking unit. The knob unit comprises a rotating cover with an open end, and a rotary shaft being mounted to the open end of the rotating cover. The locking unit comprises a rotary wheel comprising a main body being fixed to the rotary shaft, and a plurality of latching teeth being formed at a periphery of the main body, a gap being defined between two neighboring latching teeth, a locking pole configured to be inserted into the gap to limit rotation of the rotary wheel, and an actuator for driving the locking pole into the gap.

Preferably, the actuator comprises a solenoid which comprises a stationary part and a moving part moveable relative to the stationary part, the locking pole being connected to the moving part or being a portion of the moving part.

Preferably, the locking pole is made of iron.

Preferably, each of the latching teeth comprises a first end, a second end, and a transition surface interconnecting the first end and the second end, a distance between the first end and the central axis of the rotary wheel is greater than a distance between the second end and the central axis of the rotary wheel, and the transition surface is curved; when the rotating cover rotates along a first direction, the actuator drives the locking pole to a first locking position, an end of the locking pole is located between the first end and the second end of two neighboring latching teeth along a radial direction of the rotary wheel; when the rotating cover rotates reversely along a second direction, the actuator drives the locking pole to a second locking position, the end of the locking pole is inside of the first end and the second end of two neighboring latching teeth along the radial direction of the rotary wheel.

Preferably, further comprising a motor fixed to the rotating cover and a carbon brush slip ring unit, the carbon brush slip ring unit comprising a slip ring fixed around the rotary shaft and a carbon brush slidably contacting with the slip ring, the motor being connected to the slip ring by wires.

Preferably, the rotary shaft defines a wire channel for laying the wires.

Compared with the related arts, the knob device for vehicle provided by the present disclosure is provided with a locking unit which includes a rotary wheel, an iron core cooperating with the rotary wheel, and a solenoid configured for driving the iron core to extend out or retract. The rotary wheel includes a plurality of latching teeth, and a gap is defined between two neighboring latching teeth. Locking of the rotary wheel clockwise and counterclockwise can be realized by adjusting a depth of the iron core inserted into the gap, thereby realizing diversified functions of the knob unit.

BRIEF DESCRIPTION OF THE DRAWINGS

In order to more clearly explain the technical solutions of the embodiments of the present disclosure, drawings required in the description of the embodiments will be briefly introduced below. Obviously, the drawings in the following description are only embodiments of the present disclosure. For those of ordinary skill in the art, other drawings can also be obtained based on these drawings without paying any creative labor, in which.

DETAILED DESCRIPTION OF THE PREFERRED EMBODIMENTS

The technical solutions in embodiments of the present disclosure will be clearly and completely described with reference to the accompanying drawings of the present disclosure. It is evident that the elements described are only some rather than all embodiments of the present disclosure. Based on the embodiments of the present disclosure, all other embodiments obtained by those skilled in the art without making any inventive effort fall into the protection scope of the present disclosure.

Figure 1:
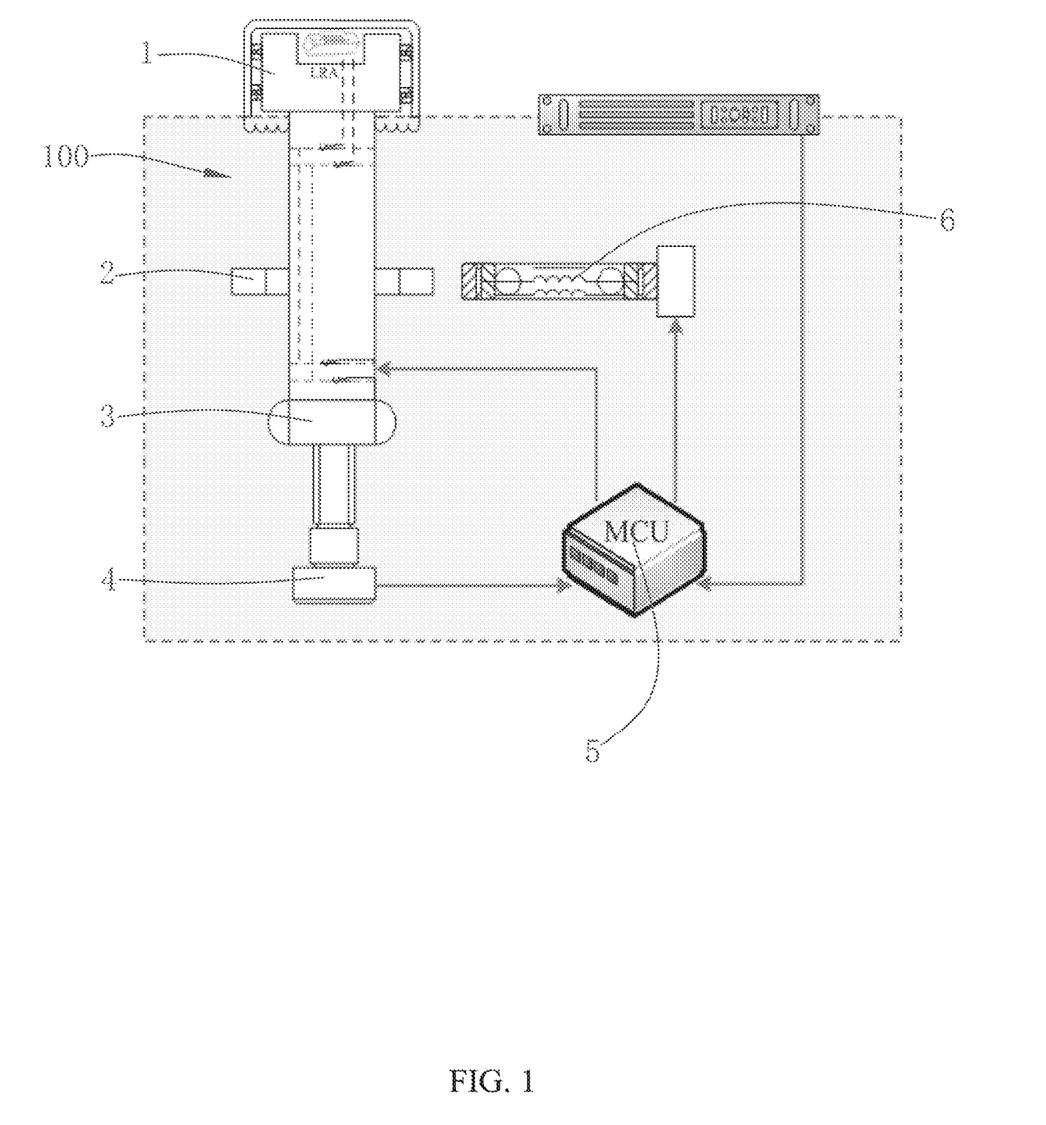
FIG. 1 is a schematic view of a knob device for vehicle provided by the present disclosure.
Figure 2:
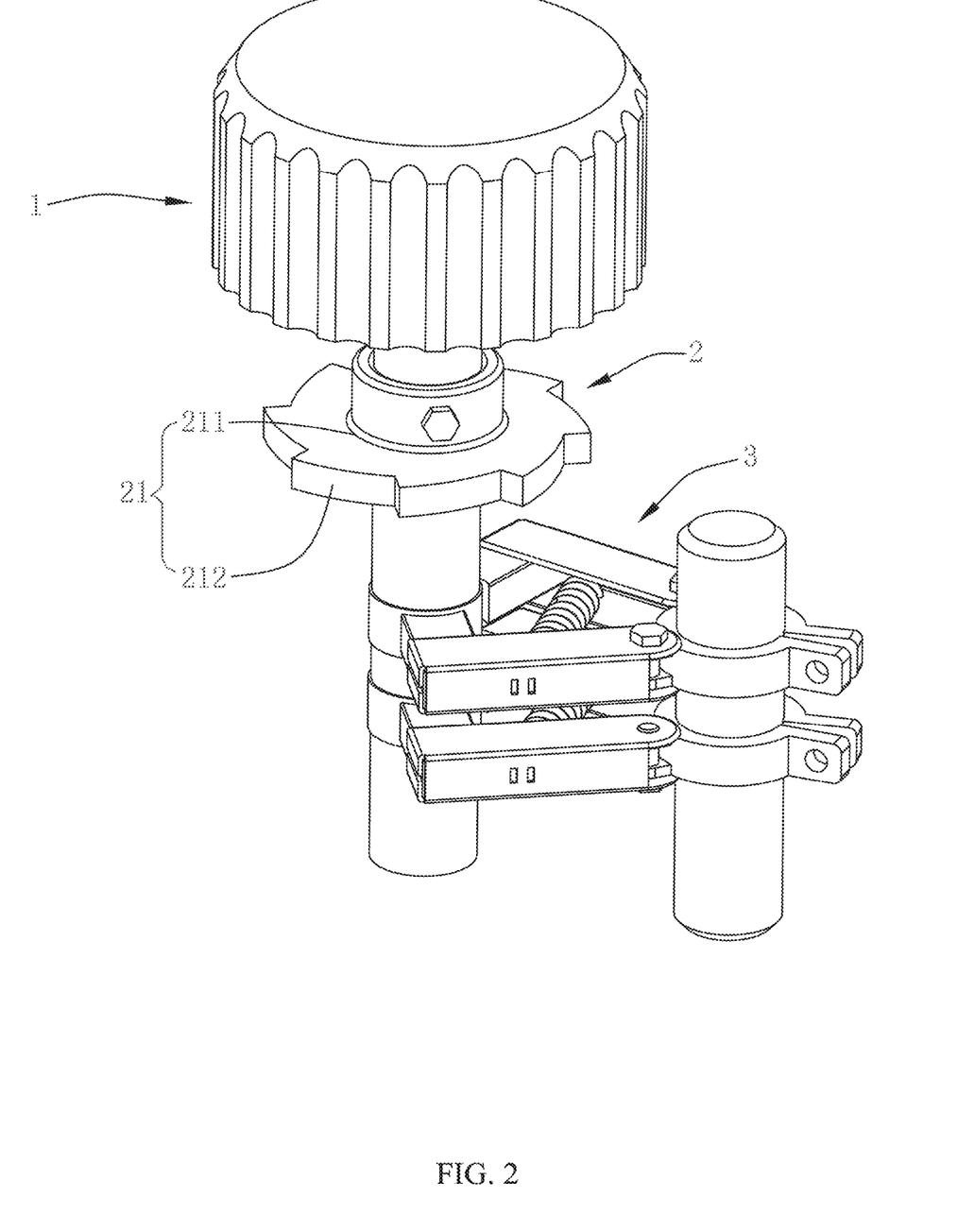
FIG. 2 is a perspective, schematic view of the knob device for vehicle provided by the present disclosure.

Referring to FIG. 1 and FIG. 2, the present disclosure provides a knob device for vehicle 100. The knob device for vehicle 100 can be used as a volume key, an air conditioning adjusting key, a screen brightness adjusting key, or other functional keys. The knob device for vehicle 100 includes a knob unit 1, a locking unit 2, a carbon brush slip ring unit 3, a coupling 4, an encoder 5, and a processor 6.

Figure 3:
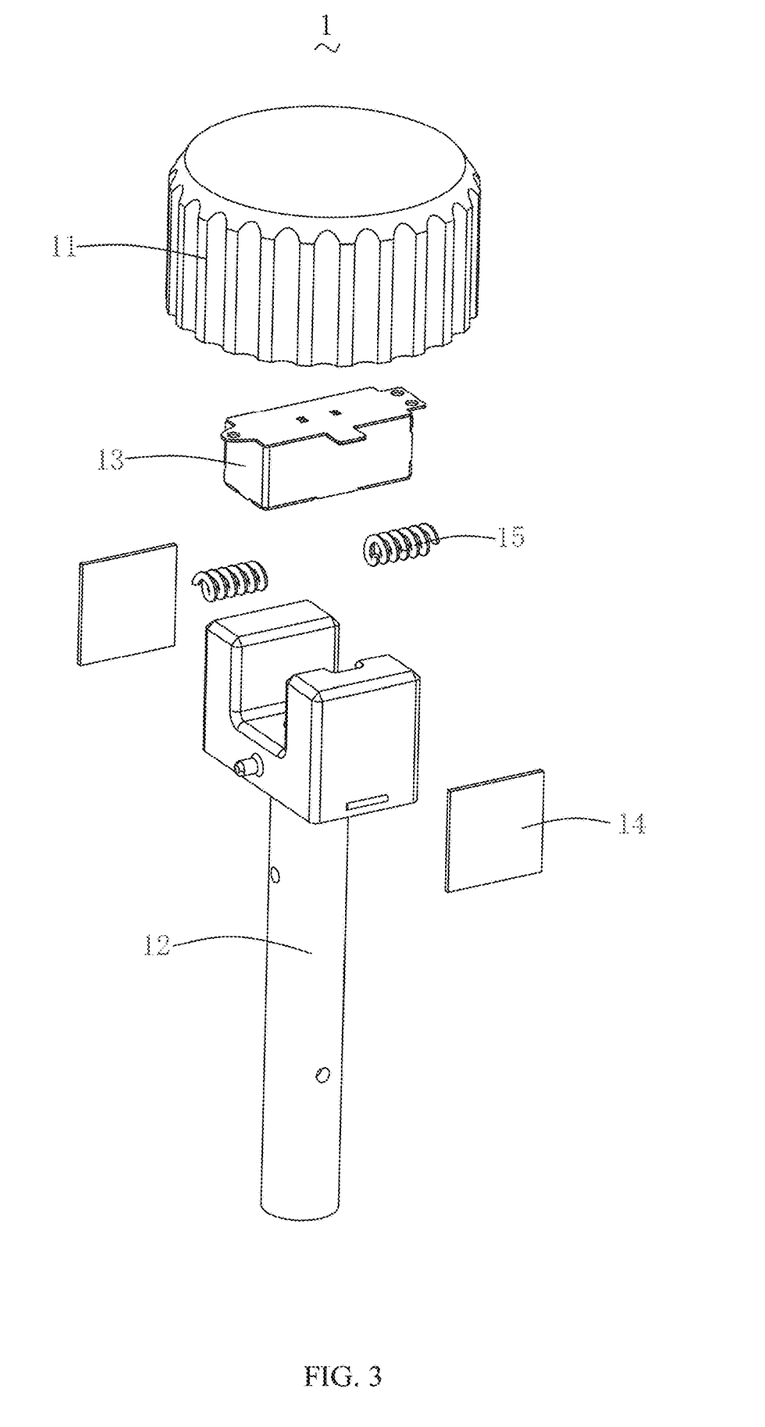
FIG. 3 is an exploded, schematic view of a knob unit shown in FIG. 2.
Figure 4:
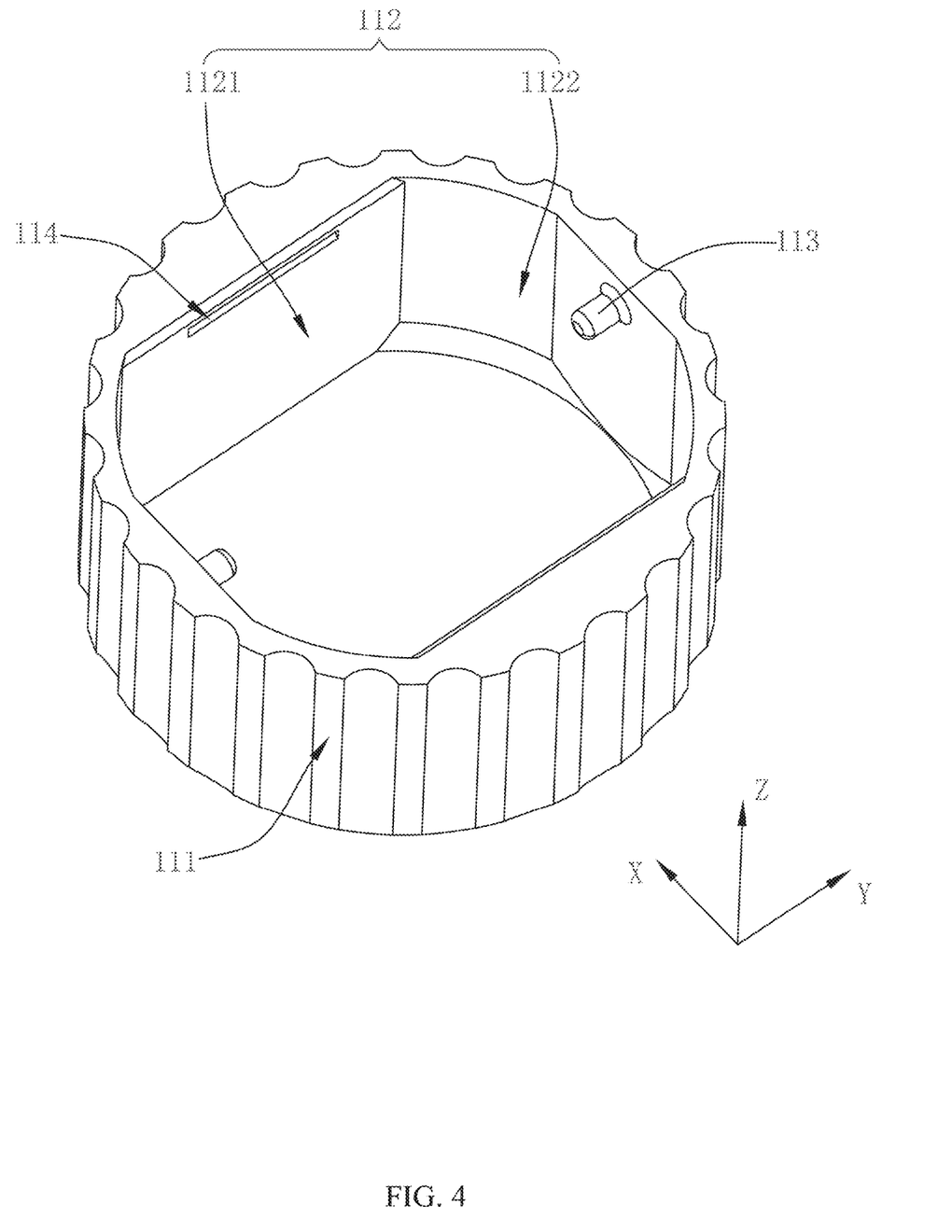
FIG. 4 is a perspective, schematic view of a rotating cover shown in FIG. 3.

Referring to FIG. 3 and FIG. 4, the knob unit 1 is used as an interactive end for the users, which includes a rotating cover 11, a rotary shaft 12, a motor 13, a foam 14 and a spring 15.

The rotating cover 11 has a cylindrical shape with one end being open and the other end being closed. The rotating cover 11 includes an outer surface 111 and an inner surface 112 opposite to the outer surface 111. The outer surface 111 is recessed along a direction towards the inner surface 112 to form a plurality of anti-skid structures. The anti-skid structures can increase the friction between the user and the knob device when the knob device is in use, and has an anti-skid effect.

The inner surface 112 includes two mounting surfaces 1121 arranged in parallel and spaced from each other and connecting surfaces 1122 interconnecting the two mounting surfaces 1121. Two symmetrical first latching poles 113 extend from the connecting surfaces 1122 along directions away from the outer surface 111. Two symmetrical latching slots 114 are recessed from the mounting surface 1121 along directions towards the outer surface 111. Specifically, the two first latching poles 113 are spaced arranged along the Y-axis direction, and the two latching slots 114 are spaced arranged along the X-axis direction. The X-axis direction is the direction of X-axis shown in FIG. 3 or FIG. 4, and the Y-axis direction is the direction of Y-axis shown in FIG. 3 or FIG. 4.

Figure 5:
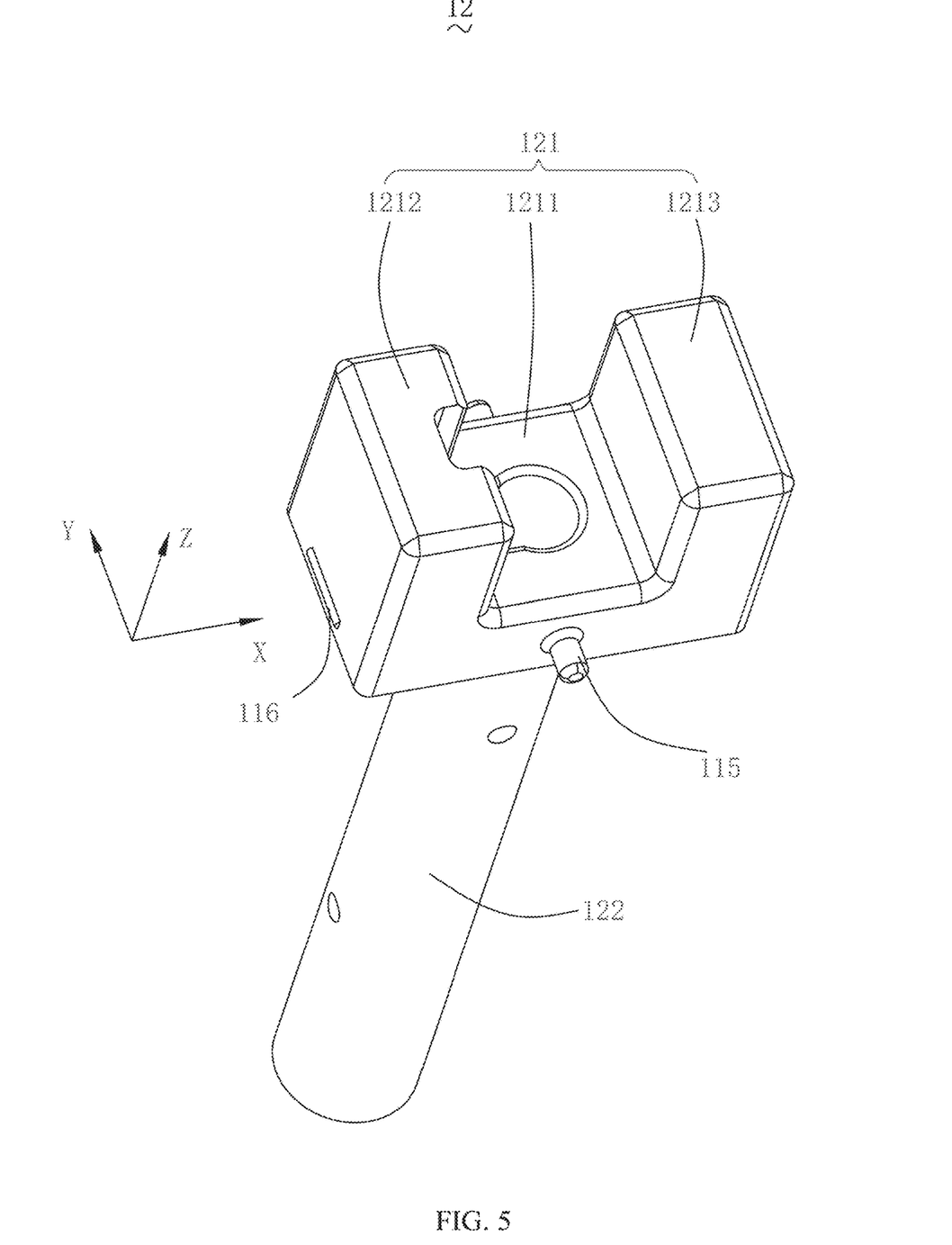
FIG. 5 is a perspective, schematic view of a rotary shaft shown in FIG. 1.
Figure 6:
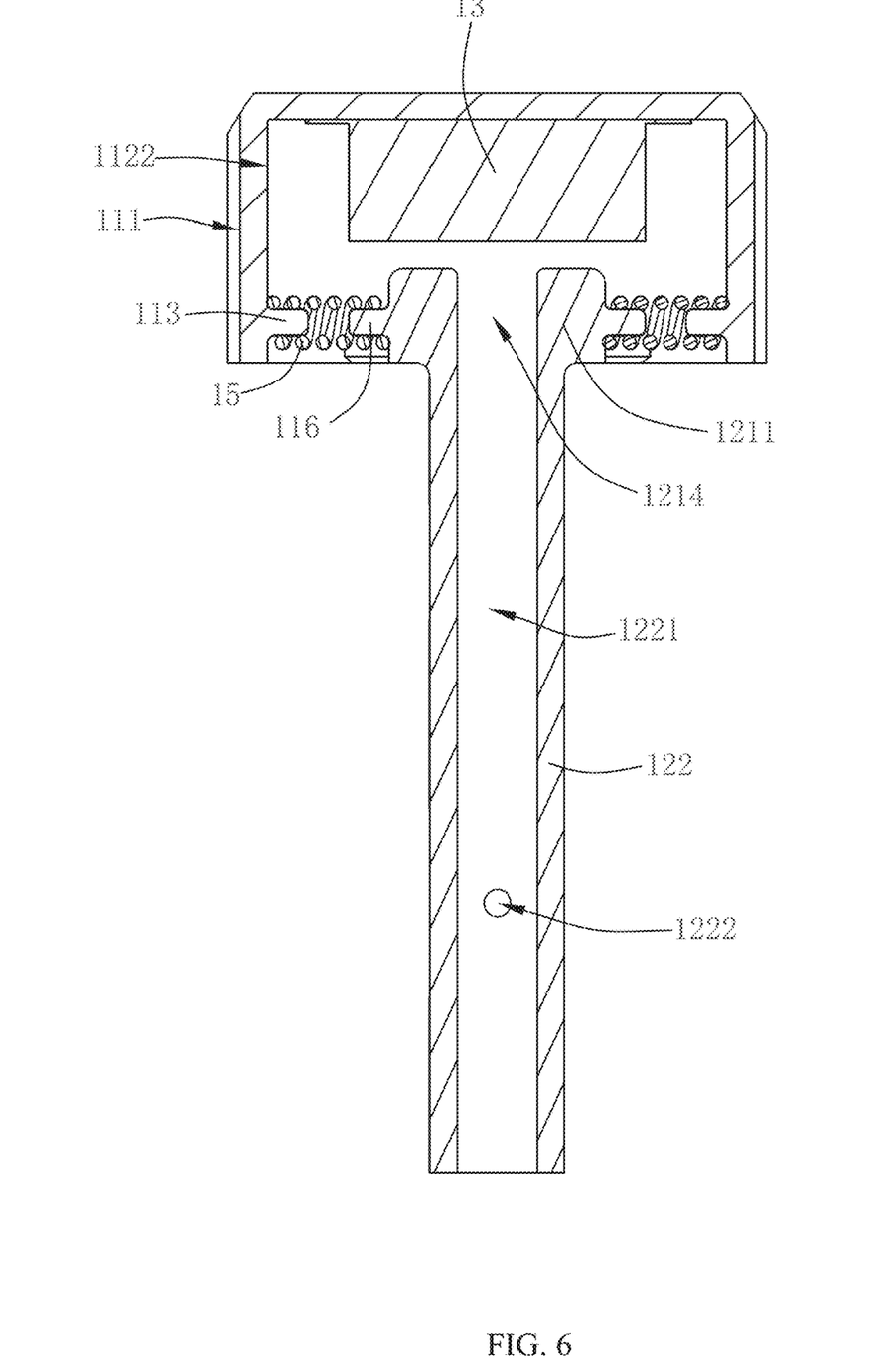
FIG. 6 is a cross-sectional view of the knob unit of FIG. 3 taken along one direction.
Figure 7:
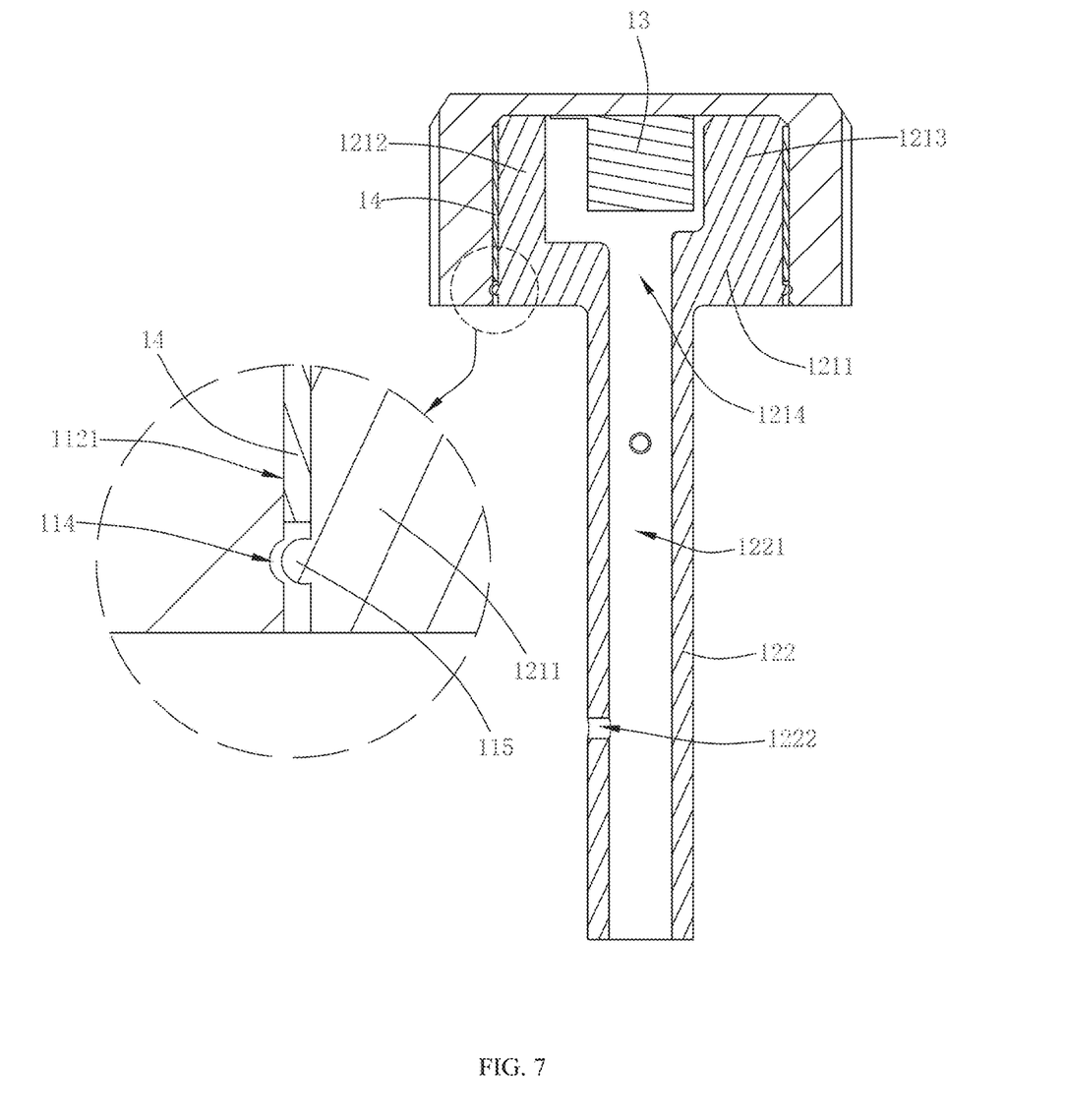
FIG. 7 is a cross-sectional view of the knob unit of FIG. 3 taken along another direction.

Referring to FIG. 5-FIG. 7, the rotary shaft 12 is mounted at the open end of the rotating cover 11. The rotary shaft 12 includes a connecting portion 121 and a shaft body 122 connected to the connecting portion 121. The connecting portion 121 and the shaft body 122 are integrally formed.

The connecting portion 121 is received in an opening of the rotating cover 11. The connecting portion 121 includes a first portion 1211 connected to the shaft body 122, and a second portion 1212 and a third portion 1213 which from opposite two ends of the first portion 1211 along a direction away from the shaft body 122. The second portion 1212 and the third portion 1213 are arranged in parallel and spaced from each other. The second portion 1212 and the third portion 1213 correspondingly abut on the mounting surfaces 1121. Since the mounting surfaces 1121 are flat, a contact area between the rotary shaft 12 and the rotating cover 11 is increased, and torque thus can be transmitted effectively, thereby transmitting a rotating driving force from the rotating cover 11 to the shaft body 122 to drive the shaft body 122 to rotate. The foam 14 is correspondingly sandwiched between the rotary shaft 12 and the mounting surface 1121, which can reduce noise and improve user experience.

The first portion 1211 is provided with a first through hole 1214 along the Z-axis direction. In this embodiment, the Z-axis direction is the height direction of the rotary shaft 12. The shaft body 122 is fixedly connected to the first portion 1211. The shaft body 122 is provided with a second through hole 1221 along the Z-axis direction. The first through hole 1214 communicates with the second through hole 1221, cooperatively forming a wire channel.

Further, a side wall of the shaft body 122 defines a wire hole 1222 which communicates the second through hole 1221 with the outside.

A pair of protrusions 115 extends respectively from opposite two ends of the first portion 1121 along directions towards the mounting surfaces of the rotating cover 11. The protrusions 115 conform to the latching slots 114, and are engaged in the corresponding latching slots 114, thereby realizing connection of the rotating cover 11 and the rotary shaft 12 and effectively avoiding displacement of the rotary shaft 122 relative to the rotating cover 11 along the Z-axis direction.

A second latching pole 116 extends respectively from each of two sides of the first portion 1211 along a direction towards the rotating cover 11, and positions of the second latching poles 116 correspond to that of the first latching poles 113, respectively. One end of the spring 15 is mounted around the first latching pole 113, the other end of the spring 15 is mounted around the second latching pole 116. End portions of the first latching pole 113 and the second latching poles 116 are spaced from each other, and a middle portion of the spring 15 is suspended.

The motor 13 is fixedly connected to the rotating cover 11, and is located between the second portion 1212 and the third portion 1213. The motor 13 is configured to drive the rotating cover 11 to vibrate, thereby generating haptic feedback. Power wires and control wires of the motor 13 are laid in the wire channel, and does not need to be exposed, which is safe and reliable in use, and the service life of the power wires and the control wires is prolonged.

The motor 13 vibrates along the Y-axis direction, and the spring 15 is used to enhance the vibration effect of the motor 13, improving haptic feedback. Further, since the rotating shaft 12 and the rotating cover 11 are fixedly connected by engagement of the latching slots 114 and the protrusions 115, the spring 15 is thus not affected by torsion of the rotary cover 11 and is not easy to fall off the latching poles 113, 116 during the rotation of the rotary cover 11.

Figure 8:
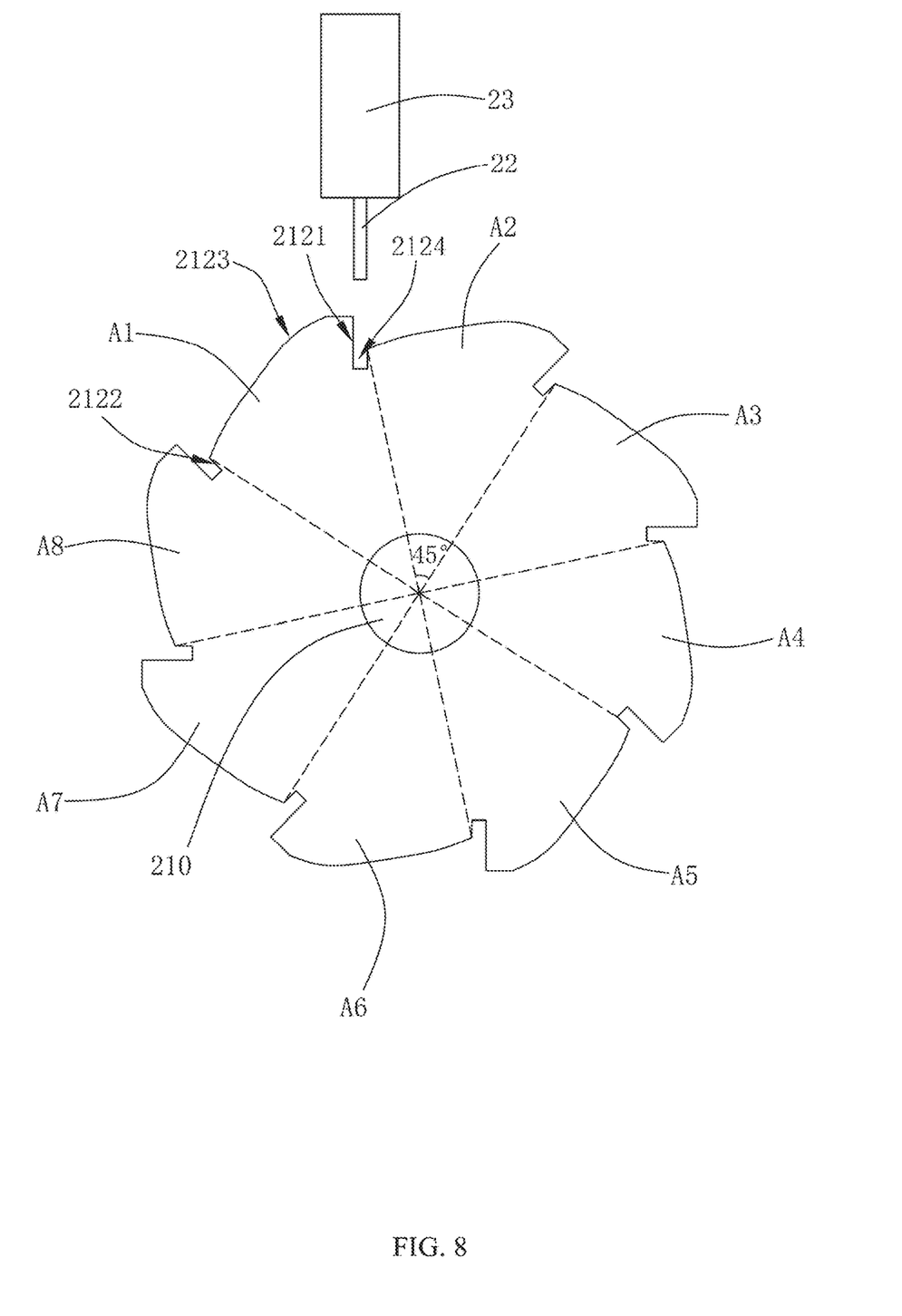
FIG. 8 is a schematic view of the knob device for vehicle provided by the present disclosure at an initial state, wherein an iron core is located at a retracted position.

Referring to FIG. 2 and FIG. 8, the locking unit 2 is used to limit the rotation of the shaft body 122, thereby realizing locking of the knob unit 1. The locking unit 2 includes a rotary wheel 21, an iron core 22 cooperating with the rotary wheel 21, and a solenoid 23 configured for driving the iron core 22 to move. The iron core 22 is connected to the solenoid 23, and the solenoid 23 is capable of driving the iron core 22 to extend out towards the rotary wheel 21 or retract.

Specifically, the rotary wheel 21 includes a main portion 211 which has a mounting hole 210 and a plurality of latching teeth 212 formed at a periphery of the main portion 211. The rotary shaft 122 is fixed in the mounting hole 210 of the main portion 211 of the rotary wheel 21. The plurality of latching teeth 212 are distributed along an annular ring around the central axis of the rotary wheel 21.

In this embodiment, the number of the latching teeth 212 is eight, that is, an index angle of the rotary wheel 21 during each rotation is 45°. In other embodiments, the number of the teeth 212 may be any other numbers, which is not limited in the present disclosure.

The latching tooth 212 includes a first end 2121, a second end 2122, and a transition surface 2123 interconnecting the first end 2121 and the second end 2122. A gap 2124 is defined between two neighboring transition teeth 212. A distance between the first end 2121 and the central axis of the rotary wheel 21 is greater than a distance between the second end 2122 and the central axis of the rotary wheel 21. The transition surface 2123 is curved. Along a circumferential direction of the rotary wheel 21, a width of the gap 2124 is greater than or equal to a width of the iron core 22.

Specifically, for more clearly describing the content of the present disclosure, the latching teeth 212 are labeled as A1 to A8 along a clockwise direction.

Figure 9:
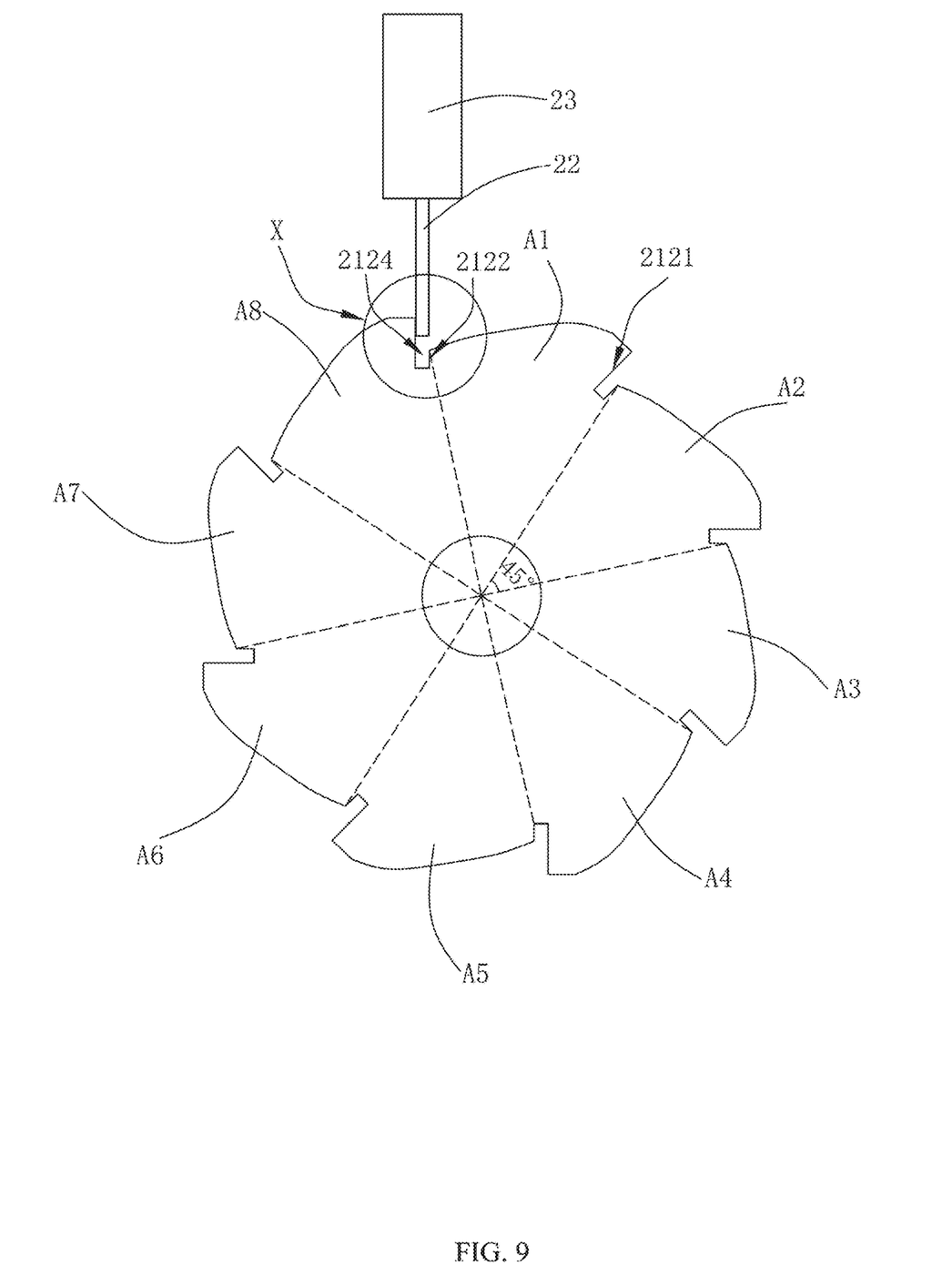
FIG. 9 is a perspective, schematic view of the knob device for vehicle of FIG. 8 at a state being locked clockwise.
Figure 10:
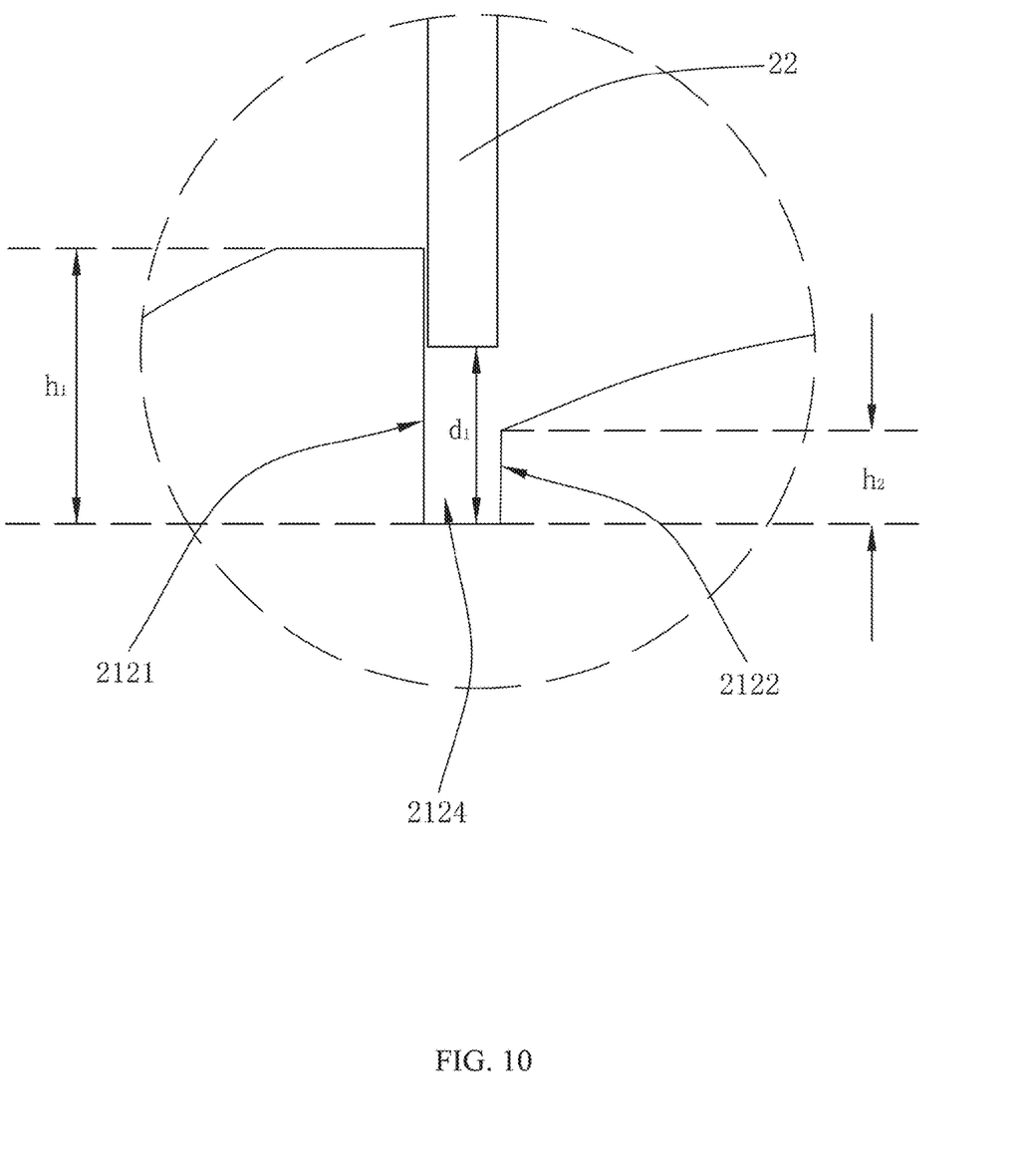
FIG. 10 is an enlarged view of the encircled part X in FIG. 9.

Referring to FIG. 8, in an initial position, the iron core 22 is aligned with the gap 2124 between the latching tooth A1 and latching tooth A2. Referring to FIG. 9, the rotating cover 11 is rotated clockwise to drive the rotary wheel 21 to rotate 45° clockwise. At the moment, the iron core 22 is aligned with the gap 2124 between the latching tooth A1 and latching tooth A8. The solenoid 23 controls the iron core 22 to extend to a first locking position M1 in which the iron core 22 is inserted into the gap 2124, and abuts against the first end 2121 of the latching tooth A8. Thus, movement of the first end 2121 of the latching tooth A8 is thoroughly blocked by the iron core 22, and the clockwise rotation of the rotary wheel 21 is therefore blocked. Consequently, the knob unit 1 is locked. Referring to FIG. 10, it should be noted that: h2≤d1≤h1, wherein d1 is a distance between the end of the iron core 22 and the bottom of the gap 2124 at the first locking position M1, h1 is a height of the first end 2121 relative to the bottom of the gap 2124, and h2 is a height of the second end 2122 relative to the bottom of the gap 2124.

Figure 11:
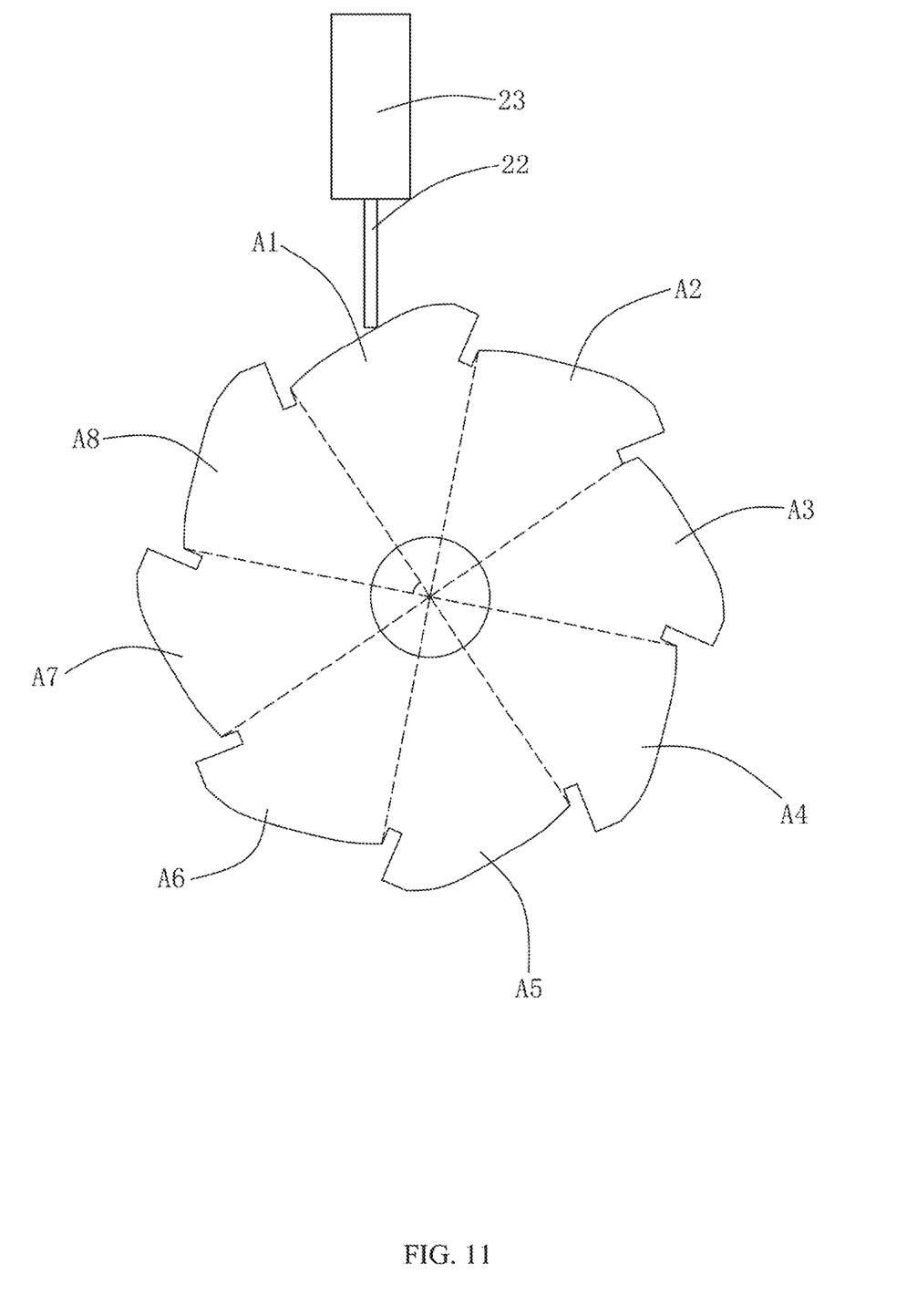
FIG. 11 is a schematic view of the knob device for vehicle of FIG. 8 at a state rotating counterclockwise.
Figure 12:
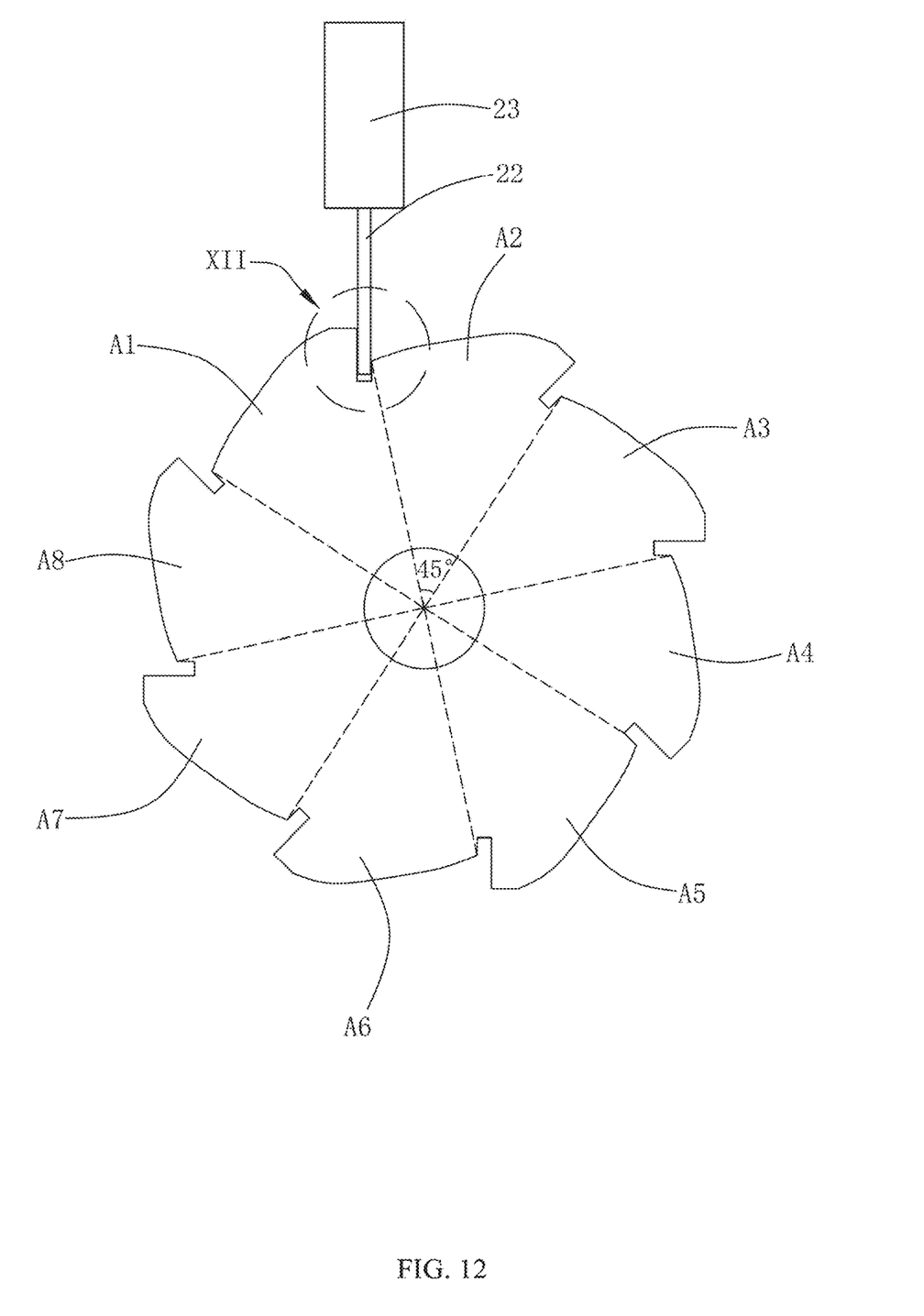
FIG. 12 is a schematic view of the knob device for vehicle of FIG. 8 at a state being locked counterclockwise.
Figure 13:
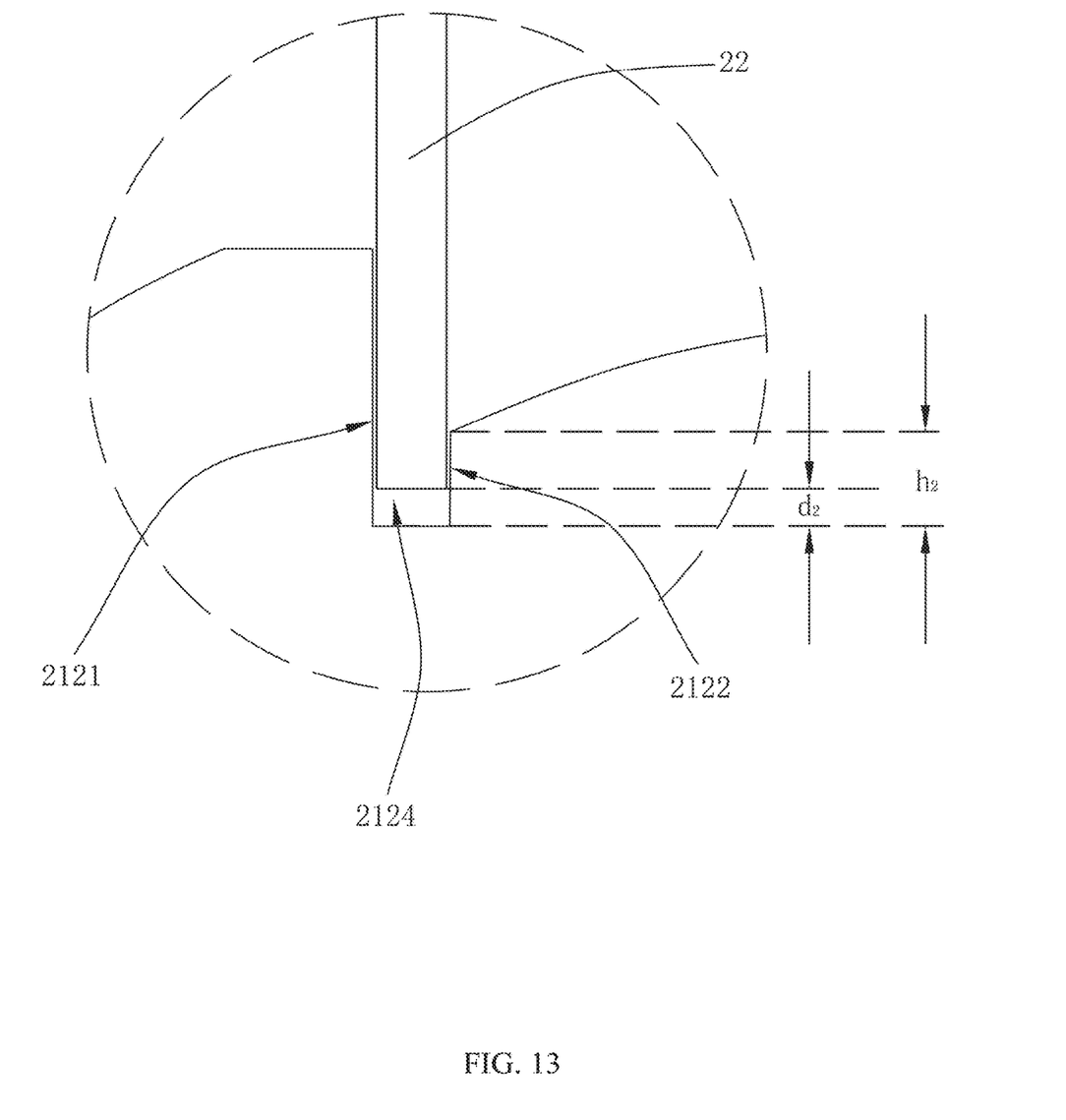
FIG. 13 is an enlarged view of the encircled part XII in FIG. 12.

Referring to FIG. 11 and FIG. 12, at the above state, the rotating cover 11 is further rotated counterclockwise. Since the transition surface 2123 of the latching tooth A1 is curved, the latching tooth A1 generates a force to push the iron core 22 back during rotation thereof until the latching tooth A1 rotate counterclockwise to the initial position. The solenoid 23 controls the iron core 22 to extend to a second locking position M2. At the moment, the iron core is inserted into the gap 2124 between the latching teeth A1 and A2 and abuts against the second end 2122 of the latching tooth A2, movement of the second end 2122 of the latching tooth A2 is thoroughly blocked by the iron core 22, the counterclockwise rotation of the rotary wheel 21 is thus blocked. As a result, the knob unit 1 is locked. Referring to FIG. 13, it should be noted that at the second locking position M2 a distance d2 between the end of the iron core 22 and the bottom of the gap 2124 is not greater than h2, i.e., d2≤h2, wherein h2 is the height of the second end 2122 relative to the bottom of the gap 2124.

The rotary wheel 21 is capable of locking the knob unit 1 clockwise and counterclockwise, thereby realizing diverse use requirements of the knob device 100.

Figure 14:
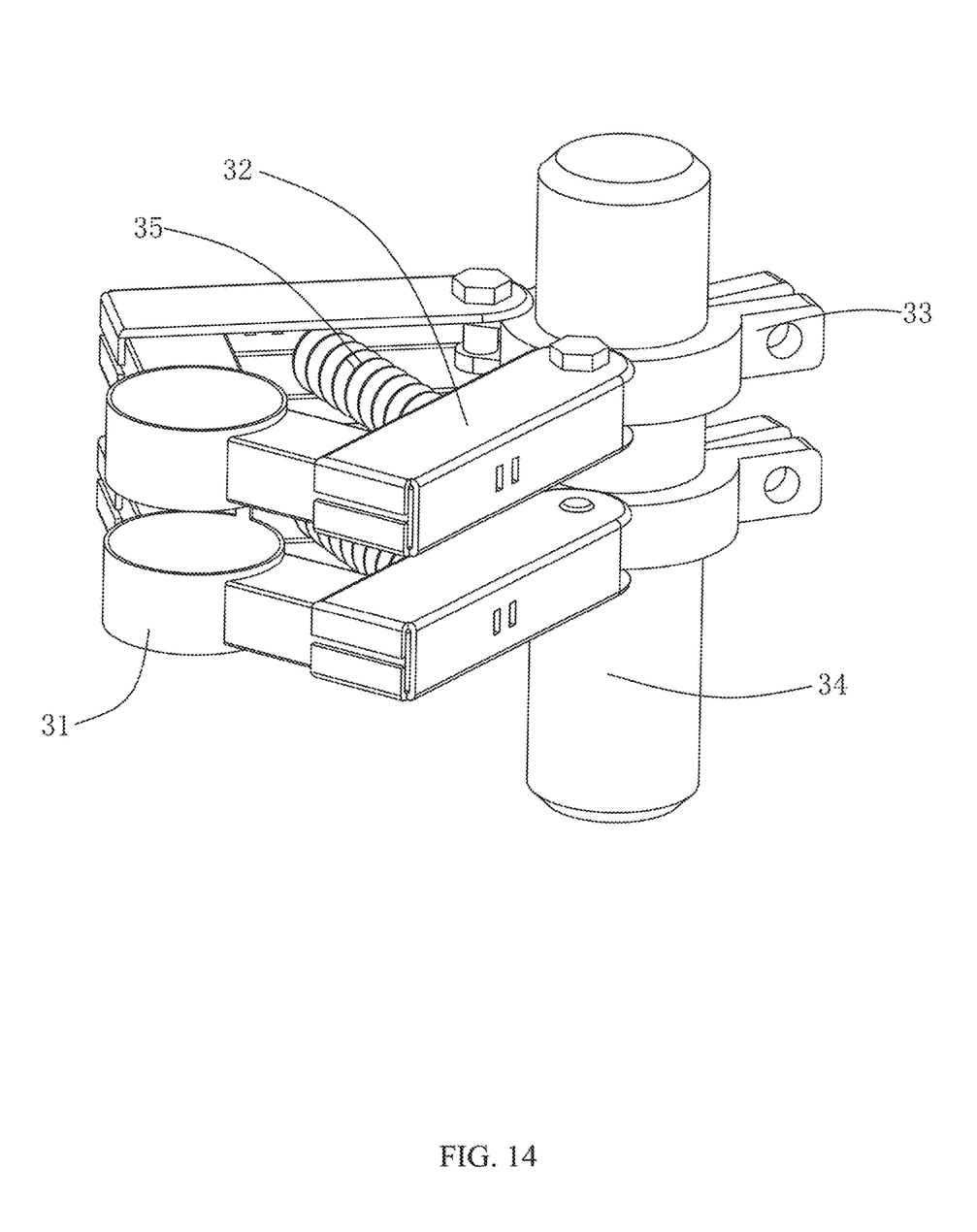
FIG. 14 is a perspective, schematic view of a carbon brush slip ring unit.

The carbon brush slip ring unit 3 is connected to the knob unit 1, for providing electric power to the motor 13. Specifically, the carbon brush slip ring unit 3 includes slip rings 31 mounted around the shaft body 122, carbon brushes 32 for slidably contacting with the slip rings 31, and terminals 33 connected to the carbon brushes 32. The terminals 33 are fixed on a fixed shaft 34.

Referring to FIG. 14, in this embodiment, the number of the slip rings 31 is two, and the two slip rings 31 are spaced from each other. The power wires of the motor 13 extend through the wire hole 1222 and are fixed to the slip rings 31 respectively. Two opposite sides of each of the slip rings 31 are provided with corresponding two of the carbon brushes 32. An elastic member 35 is arranged between the corresponding two carbon brushes 32, and the two carbon brushes 32 are simultaneously fixed to one of the terminals 33. When the shaft body 122 rotates, the shaft body 122 and the slip rings 31 rotate relative to the carbon brushes 32 and the slip rings 31 and carbon brushes 32 are always kept in a contact state, which can effectively transfer electric energy from the carbon brushes 32 to the power wires of the motor 13. The elastic member 35 is sandwiched between two carbon brushes 32 and is in an extended state after installation. The extended elastic member 35 can generate a tighten force on the two carbon brushes 32 to urge the carbon brushes 32 to firmly contact with the slip rings 31 and avoid displacement of the carbon brushes 32 away from the slip rings 31.

The terminals 33 are configured to be electrically connected to an external power source, for providing electric power to the motor 13.

Referring to FIG. 1, the encoder 5 is connected to the shaft body 122 by the coupling 4. The encoder 5 is used to detect the rotation angle of the rotary wheel 21 and transmit the detection data to the controller 6. The controller 6 receives the detection data, and controls the operation of the solenoid 23.

Compared with the related arts, the knob device for vehicle 100 provided by the present disclosure is provided with a locking unit 2 which includes a rotary wheel 21, an iron core 22 cooperating with the rotary wheel 21, and a solenoid 23 configured for driving the iron core 22 to extend out or retract. The rotary wheel 21 includes a plurality of latching teeth 212, and a gap 2124 is defined between two neighboring latching teeth 212. Locking of the rotary wheel 21 clockwise and counterclockwise can be realized by adjusting a depth of the iron core 22 being inserted into the gap 2124, thereby realizing diverse functions of the knob unit 1.

The above are only embodiments of the present disclosure. It should be noted that those of ordinary skill in the art can make improvements without departing from the inventive concept of the present disclosure, but these improvements should be within the protection scope of the present disclosure.

The invention claimed is:

1. A knob device for vehicle comprising a knob unit and a locking unit, the knob unit comprising:
a rotating cover with an open end,
a rotary shaft being mounted to the open end of the rotating cover, and
a motor being fixed to the rotating cover and configured to drive the rotating cover to vibrate; and the locking unit comprising:

a rotary wheel being mounted to the rotary shaft, the rotary wheel comprising a main body being fixed to the rotary shaft, and a plurality of latching teeth being formed at a periphery of the main body, the plurality of latching teeth being distributed in a ring around a central axis of the rotary wheel, a gap being defined between two neighboring latching teeth, an iron core being provided corresponding to the gap and configured to be inserted into the gap to limit rotation of the rotary wheel, and a solenoid being connected to the iron core and configured to drive the iron core to move.

2. The knob device for vehicle of claim 1, wherein the number of the latching teeth is eight, and an angle spanned by each latching tooth is 45°.

3. The knob device for vehicle of claim 1, wherein each of the latching teeth comprises a first end, a second end, and a transition surface interconnecting the first end and the second end, a distance between the first end and the central axis of the rotary wheel is greater than a distance between the second end and the central axis of the rotary wheel, and the transition surface is curved.

4. The knob device for vehicle of claim 1, wherein a width of the iron core is greater than or equal to a width of the gap in a circumferential direction of the rotary wheel.

5. The knob device for vehicle of claim 1, wherein the rotating cover comprises an outer surface and an inner surface opposite to the outer surface, the inner surface comprises two mounting surfaces arranged in parallel and spaced from each other and two connecting surfaces connecting the two mounting surfaces.

6. The knob device for vehicle of claim 5, wherein two symmetrical first latching poles extend from the connecting surfaces along directions away from the outer surface, two symmetrical latching slots are recessed from the mounting surfaces along directions towards the outer surface, the two first latching poles are arranged along a Y-axis direction, and the two latching slots are arranged along an X-axis direction, wherein the Y-axis direction is a vibration direction of the motor, and the X-axis direction is perpendicular to the Y-axis direction.

7. The knob device for vehicle of claim 6, wherein the rotary shaft comprises a connecting portion and a shaft body connected to the connecting portion, the connecting portion is received in the open end of the rotating cover, the connecting portion comprises a first portion connected to the shaft body, and a second portion and a third portion which extend from opposite two ends of the first portion along a direction away from the shaft body, the second portion and the third portion are arranged in parallel and spaced from each other, and the second portion and the third portion abut on the mounting surfaces respectively.

8. The knob device for vehicle of claim 7, wherein a space is formed between the second portion and the third portion, and the motor is received in the space.

9. The knob device for vehicle of claim 7, wherein the connecting portion and the shaft body are integrally formed.

10. The knob device for vehicle of claim 7, wherein a protrusion extends from each of the two ends of the first portion along a direction towards the mounting surface of the rotating cover, the protrusions conform to the latching slots respectively, and the protrusions are engaged in the latching slots respectively.

11. The knob device for vehicle of claim 7, wherein a second latching pole extends from each of two sides of the first portion along a direction towards the connecting surface of the rotating cover, each second latching pole is aligned with a corresponding one first latching pole, the knob unit further comprises a spring, one end of the spring is mounted around the first latching pole, the other end of the spring is mounted around the second latching pole, end portions of the first latching pole and the second latching pole are spaced from each other, and a middle portion of the spring between the end portions of the first latching pole and the second latching pole is suspended.

12. The knob device for vehicle of claim 1, wherein the knob device for vehicle further comprises an encoder and a controller, the encoder is connected to the rotary shaft by a coupling, the encoder is configured to detect a rotation angle of the rotary wheel and transmit a detection data in response to the rotation angle to the controller, and the controller is configured to control operation of the solenoid in response to the detection data.

13. The knob device of claim 1, further comprising a brush slip ring unit which comprises a pair of slip rings fixed around the rotary shaft and brushes slidably contacting with the slip rings respectively, wherein the rotary shaft defines a wire channel, and power wires of the motor are arranged in the wire channel and electrically connected to the slip rings respectively.

14. The knob device of claim 13, wherein the brush slip ring unit comprises a pair of brushes corresponding to each of the slip rings, and an elastic member connected between the pair of brushes and configured to urge the pair of brushes to firmly contact with the corresponding slip ring.

15. A knob device for vehicle comprising a knob unit and a locking unit,
the knob unit comprising:
a rotating cover with an open end, and
a rotary shaft being mounted to the open end of the rotating cover; and
the locking unit comprising:
a rotary wheel comprising a main body being fixed to the rotary shaft, and a plurality of latching teeth being formed at a periphery of the main body, a gap being defined between two neighboring latching teeth,
a locking pole configured to be inserted into the gap to limit rotation of the rotary wheel, and
an actuator for driving the locking pole into the gap.

16. The knob device of claim 15, wherein the actuator comprises a solenoid which comprises a stationary part and a moving part moveable relative to the stationary part, the locking pole being connected to the moving part or being a portion of the moving part.

17. The knob device of claim 16, wherein the locking pole is made of iron.

18. The knob device of claim 16, wherein each of the latching teeth comprises a first end, a second end, and a transition surface interconnecting the first end and the second end, a distance between the first end and the central axis of the rotary wheel is greater than a distance between the second end and the central axis of the rotary wheel, and the transition surface is curved; when the rotating cover rotates along a first direction, the actuator drives the locking pole to a first locking position, an end of the locking pole is located between the first end and the second end of two neighboring latching teeth along a radial direction of the rotary wheel; when the rotating cover rotates reversely along a second direction, the actuator drives the locking pole to a second locking position, the end of the locking pole is inside of the first end and the second end of two neighboring latching teeth along the radial direction of the rotary wheel.

19. The knob device of claim 15, further comprising a motor fixed to the rotating cover and a carbon brush slip ring unit, the carbon brush slip ring unit comprising a slip ring fixed around the rotary shaft and a carbon brush slidably contacting with the slip ring, the motor being electrically connected to the slip ring by wires.

20. The knob device of claim 19, wherein the rotary shaft defines a wire channel through which the wires extend.

* * * * *